US009798655B2

(12) United States Patent
Coudhury et al.

(10) Patent No.: US 9,798,655 B2
(45) Date of Patent: Oct. 24, 2017

(54) MANAGING A CACHE ON STORAGE DEVICES SUPPORTING COMPRESSION

(71) Applicant: Oracle International Corporation, Redwood Shores, CA (US)

(72) Inventors: Nilesh Coudhury, Redwood City, CA (US); Selcuk Aya, San Carlos, CA (US); Zheren Zhang, Milpitas, CA (US); Kothanda Umamageswaran, Sunnyvale, CA (US); Juan Loaiza, Woodside, CA (US)

(73) Assignee: Oracle International Corporation, Redwood Shores, CA (US)

( * ) Notice: Subject to any disclaimer, the term of this patent is extended or adjusted under 35 U.S.C. 154(b) by 177 days.

(21) Appl. No.: 14/229,809

(22) Filed: Mar. 28, 2014

(65) Prior Publication Data

US 2015/0089121 A1    Mar. 26, 2015

Related U.S. Application Data

(60) Provisional application No. 61/880,634, filed on Sep. 20, 2013.

(51) Int. Cl.
*G06F 13/00* (2006.01)
*G06F 12/02* (2006.01)
(Continued)

(52) U.S. Cl.
CPC ...... *G06F 12/0246* (2013.01); *G06F 12/0804* (2013.01); *G06F 12/0871* (2013.01);
(Continued)

(58) Field of Classification Search
None
See application file for complete search history.

(56) References Cited

U.S. PATENT DOCUMENTS

| 4,425,615 A | 1/1984 | Swenson et al. |
| 5,717,893 A | 2/1998 | Mattson |

(Continued)

FOREIGN PATENT DOCUMENTS

| CN | 101150483 A | 3/2008 |
| GB | 2409 301 A | 6/2005 |

(Continued)

OTHER PUBLICATIONS

PCT/US2009/057526 International Search Report and Written Opinion dated Sep. 18, 2009, 17 pages.

(Continued)

*Primary Examiner* — Sean D Rossiter
(74) *Attorney, Agent, or Firm* — Hickman Palermo Becker Bingham LLP

(57) ABSTRACT

Flash memory on a flash memory device is virtualized using compression that is native to the flash memory device. Through compression, the flash memory device is used to logically store more data in a virtual address space that is larger than the physical address space of the flash memory device. Physical storage capacity of a flash memory device may prevent further storage of data even when the virtual address space is not fully populated. Because compressibility may vary, the extent to which the virtual address space may be populated before physical storage capacity is reached varies. The approaches for virtual memory described herein rely on the memory device client to monitor when this point is reached. In addition, the memory device client is responsible for freeing space as needed to accommodate subsequent requests to store data in the flash memory.

18 Claims, 4 Drawing Sheets

(51) Int. Cl.
*G06F 12/0804* (2016.01)
*G06F 12/0871* (2016.01)

(52) U.S. Cl.
CPC ............... *G06F 2212/1036* (2013.01); *G06F 2212/1044* (2013.01); *G06F 2212/313* (2013.01); *G06F 2212/401* (2013.01); *G06F 2212/7201* (2013.01); *G06F 2212/7204* (2013.01); *G06F 2212/7208* (2013.01)

(56) References Cited

U.S. PATENT DOCUMENTS

| | | |
|---|---|---|
| 5,774,643 A | 6/1998 | Lubbers |
| 6,044,367 A | 3/2000 | Wolff |
| 6,457,105 B1 | 9/2002 | Spencer et al. |
| 6,728,823 B1 | 4/2004 | Walker et al. |
| 6,886,084 B2 | 4/2005 | Kawashima et al. |
| 6,922,754 B2 | 7/2005 | Liu et al. |
| 6,928,451 B2 | 8/2005 | Mogi et al. |
| 7,069,324 B1 | 6/2006 | Tiwana et al. |
| 7,159,076 B2 | 1/2007 | Madter |
| 7,165,144 B2 | 1/2007 | Choubal et al. |
| 7,228,354 B2 | 6/2007 | Chambliss et al. |
| 7,237,027 B1 | 6/2007 | Raccah et al. |
| 7,290,090 B2 | 10/2007 | Madter |
| 7,461,147 B1 | 12/2008 | Mowat et al. |
| 7,506,103 B2 | 3/2009 | Madter |
| 7,636,814 B1 | 12/2009 | Karr et al. |
| 7,660,945 B1 | 2/2010 | Lee |
| 7,836,262 B2 | 11/2010 | Gunna et al. |
| 7,904,562 B2 | 3/2011 | Takase et al. |
| 8,244,984 B1 | 8/2012 | Glasco et al. |
| 8,327,080 B1 | 12/2012 | Der |
| 8,370,452 B2 | 2/2013 | Harvell et al. |
| 8,683,139 B2 | 3/2014 | Gaither |
| 9,003,159 B2* | 4/2015 | Deshkar ............ G06F 12/0246 707/813 |
| 9,256,542 B1 | 2/2016 | Flower |
| 2002/0143755 A1 | 10/2002 | Wynblatt et al. |
| 2003/0115324 A1 | 6/2003 | Blumenau |
| 2004/0003087 A1 | 1/2004 | Chambliss et al. |
| 2004/0054860 A1 | 3/2004 | Dixit |
| 2004/0062106 A1 | 4/2004 | Ramesh et al. |
| 2004/0117441 A1 | 6/2004 | Liu et al. |
| 2004/0148486 A1 | 7/2004 | Burton |
| 2004/0225845 A1 | 11/2004 | Kruckermyer et al. |
| 2004/0230753 A1 | 11/2004 | Amiri |
| 2004/0254943 A1 | 12/2004 | Malcolm |
| 2005/0086520 A1 | 4/2005 | Dharmapurikar et al. |
| 2005/0120025 A1 | 6/2005 | Rodriguez et al. |
| 2005/0160224 A1 | 7/2005 | Cuomo et al. |
| 2005/0210202 A1 | 9/2005 | Choubal et al. |
| 2006/0106890 A1 | 5/2006 | Paul et al. |
| 2006/0209444 A1* | 9/2006 | Song ............... G06F 3/0625 360/31 |
| 2006/0224451 A1 | 10/2006 | Kerschbrock et al. |
| 2006/0224551 A1 | 10/2006 | Lariba-Pey |
| 2006/0271740 A1 | 11/2006 | Mark |
| 2007/0067575 A1 | 3/2007 | Morris et al. |
| 2007/0124415 A1 | 5/2007 | Lev-Ran et al. |
| 2007/0260819 A1 | 11/2007 | Gao et al. |
| 2007/0271570 A1 | 11/2007 | Brown et al. |
| 2008/0016283 A1 | 1/2008 | Madter |
| 2008/0046736 A1 | 2/2008 | Arimilli et al. |
| 2008/0104283 A1 | 5/2008 | Shin et al. |
| 2008/0104329 A1 | 5/2008 | Gaither |
| 2008/0147599 A1 | 6/2008 | Young-Lai |
| 2008/0155229 A1 | 6/2008 | Beyer et al. |
| 2008/0177803 A1 | 7/2008 | Fineberg et al. |
| 2008/0244184 A1 | 10/2008 | Lewis et al. |
| 2008/0244209 A1 | 10/2008 | Seelam et al. |
| 2009/0164536 A1 | 6/2009 | Nasre et al. |
| 2009/0248871 A1 | 10/2009 | Takase et al. |
| 2010/0017556 A1 | 1/2010 | Chin et al. |
| 2010/0077107 A1 | 3/2010 | Lee et al. |
| 2010/0082648 A1 | 4/2010 | Potapov et al. |
| 2010/0122026 A1 | 5/2010 | Umamageswaran et al. |
| 2010/0158486 A1* | 6/2010 | Moon ............... H04N 5/765 386/241 |
| 2011/0022801 A1 | 1/2011 | Flynn |
| 2011/0040861 A1 | 2/2011 | Van der Merwe |
| 2011/0047084 A1 | 2/2011 | Manzallini et al. |
| 2011/0153719 A1 | 6/2011 | Santoro |
| 2011/0173325 A1 | 7/2011 | Cherian et al. |
| 2011/0191543 A1 | 8/2011 | Craske et al. |
| 2011/0238899 A1* | 9/2011 | Yano ............... G06F 12/0246 711/103 |
| 2012/0159480 A1 | 6/2012 | Matsuzawa |
| 2013/0086330 A1 | 4/2013 | Baddepudi et al. |
| 2013/0275402 A1 | 10/2013 | Zhou et al. |
| 2013/0326152 A1 | 12/2013 | Loaiza et al. |
| 2014/0089565 A1* | 3/2014 | Lee ............... G06F 3/061 711/103 |
| 2014/0149638 A1* | 5/2014 | Jain ............... G06F 11/002 711/103 |
| 2014/0281167 A1* | 9/2014 | Danilak ............ G06F 3/0688 711/103 |
| 2015/0006813 A1 | 1/2015 | Goyal et al. |
| 2015/0012690 A1* | 1/2015 | Bruce ............... G06F 3/065 711/103 |

FOREIGN PATENT DOCUMENTS

| | | |
|---|---|---|
| JP | 2002-278704 A | 9/2002 |
| JP | 2003-150419 A | 5/2003 |
| JP | 2004-038758 A | 2/2004 |
| WO | WO 93/18461 | 9/1993 |

OTHER PUBLICATIONS

PCT/US2009/057526 current claims, 10 pages.

O'Neil, P., et al., "Multi-table joins through bitmapped join indices", SIGMOD Record, ACM, New York, NY, US, vol. 24, No. 3, Sep. 1, 1995, pp. 8-11, ISSN: 0163-5808.

Mackert, F. Lothar et al., "R* optimizer validation and performance evaluation for local queries" SIGMOD Record, ACM, New York, NY, US., vol. 15, No. 2, Jun. 1, 1986, pp. 84-95, ISSN: 0163-5808.

Zhe, Li, et al., "PERF join: an alternative to two-way semijoin and Bloomjoin" Proceedings of the 1995 ACM CIKM International Conference on Information and Knowledge Management ACM New York. NY, US., 1995, pp. 187-144, ISBN: 0-89791-812-6.

Loizos, M., et al., "Improving distributed join efficiency with extended bloom filter operations", Advanced Networking and Applications, 2007. AINA '07., 21$^{st}$ International Conference on IEEE, PI, May 1, 2007, pp. 187-194, ISBN: 978-0-7695-2846-5.

PCT/US2009/057590 International Search Report & Written Opinion dated Feb. 11, 2010, 16 pages.

PCT/US2009/057590 Current Claims, 10 pages.

Graefe, G. "The Five-minute Rule" dated Jul./Aug. 2008 (13 pages).

Bonwick, J. et al., "ZFS The Last Word in File Systems" 2009 (44 pages).

IBM TDB, "A Scheduling Algorithm for Processing Mutually Exclusive Workloads in a multi-system Configuration", ip.com dated Aug. 19, 2002 (3 pages).

Loizos et al., "Improving Join Efficiency with Extended Bloom Filter Operations", AMC, 2007, 8 pages.

U.S. Appl. No. 12/631,985, filed Dec. 7, 2009, Notice of Allowance, dated Jun. 9, 2014.

U.S. Appl. No. 14/487,358, filed Sep. 16, 2014, Office Action, dated Feb. 10, 2015.

U.S. Appl. No. 13/288,785, filed Nov. 3, 2011, Final Office Action, dated Jan. 5, 2015.

U.S. Appl. No. 14/487,358, filed Sep. 16, 2014, Final Office Action, dated Jun. 16, 2015.

U.S. Appl. No. 12/691,146, filed Jan. 21, 2010, Decision on Appeal, dated Sep. 29, 2015.

U.S. Appl. No. 14/487,358, filed Sep. 16, 2014, Advisory Action, dated Sep. 25, 2015.

(56) References Cited

OTHER PUBLICATIONS

U.S. Appl. No. 14/487,358, filed Sep. 16, 2014, Advisory Action, dated Nov. 25, 2015.
U.S. Appl. No. 12/691,146, filed Jan. 21, 2010, Office Action, dated Dec. 15, 2015.
U.S. Appl. No. 14/487,358, filed Sep. 16, 2014, Notice of Allowance, dated Mar. 29, 2016.
U.S. Appl. No. 13/288,785, filed Nov. 3, 2011, Final Office Action, dated May 6, 2016.
U.S. Appl. No. 12/691,146, filed Jan. 21, 2010, Interview Summary, dated Mar. 21, 2016.
U.S. Appl. No. 12/691,146, filed Jan. 21, 2010, Final Office Action, dated Apr. 20, 2016.
U.S. Appl. No. 13/288,785, filed Nov. 3, 2011, Interview Summary, dated Oct. 25, 2016.
U.S. Appl. No. 12/691,146, filed Jan. 21, 2010, Examiners Answers, Dec. 1, 2016.
Baddepudi, U.S. Appl. No. 13/288,785, filed Nov. 3, 2011, Office Action, dated Dec. 30, 2016.

* cited by examiner

MANAGING A CACHE ON STORAGE DEVICES SUPPORTING COMPRESSION

CROSS-REFERENCE TO RELATED APPLICATIONS

The present application claims priority to U.S. Provisional Patent Application No. 61/880,634, entitled "Manage A Dynamic Sized Cached Built From Storage Devices Supporting Compression", filed by Nilesh Choudhury, et al. on Sep. 20, 2013, the contents of which are incorporated herein by reference. The present application is related to U.S. patent application Ser. No. 13/288,785, entitled "Write-Back Storage Cache Based On Fast Persistent Memory", filed by Bharat Chandra Baddepudi, et al. on Nov. 11, 2011, the contents of which are incorporated by reference. The present application is related to application Ser. No. 12/631,985, Caching Data Between A Database Server And A Storage System, filed by Kiran Badrinarain Goyal, et al., on Dec. 7, 2009, the contents of which are incorporated by reference. The present application is related to application Ser. No. 12/691,146, Selectively Reading Data From Cache And Primary Storage Based on Whether Cache Is Overloaded, filed by Kothanda Umamageswaran, et al., on Jan. 21, 2010, the contents of which are incorporated by reference.

FIELD OF THE INVENTION

The present invention relates to storing data in flash memory devices.

BACKGROUND

Computer resource management is a core function for managing computer systems. Important goals of computer resource management are optimization of performance realized from computer resources and minimization of computer resources provisioned.

Among computer resources managed is memory, including random access volatile memory (RAM). Virtual memory is an approach used to maximize memory usage and minimize amount of memory provisioned for a computer system. Specifically, virtual memory is a memory management technique that emulates a memory as a memory having a larger physical size than the actual physical size of the memory. Memory is accessed by computer processes as a contiguous address space, each address referencing an unit of a memory, such as a memory word, memory line, memory segment, or memory block. In virtual memory, the virtual address space is much larger than the physical address space of the memory.

One way to implement virtual memory for a memory is to supplement the memory being virtualized with a different tier of memory. The virtualized memory and the other supplemental memory are together emulated as one memory addressable within a virtual address space. For example, to implement virtual memory for RAM, a temporary file on disk is used to supplement the RAM. The RAM and temporary file are emulated as RAM having a much larger virtual address space than the physical address space of the RAM.

Like RAM, flash memory is another computer resource to manage. Discussed herein are techniques for virtualization of flash memory.

DETAILED DESCRIPTION

In the following description, for the purpose of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Described herein are approaches for virtualizing flash memory on a flash memory device that compresses data. The compression is native to the flash memory device. Through compression, the flash memory device is used to logically store more data in a virtual address space that is larger than the physical address space of the flash memory device.

Physical storage capacity of a flash memory device may prevent further storage of data even when the virtual address space is not fully populated. Because compressibility may vary, the extent to which the virtual address space may be populated before physical storage capacity prevents further storage varies. The approaches for virtual memory described herein rely on the memory device client to monitor when this point is reached. In addition, the memory device client is responsible for freeing space as needed to accommodate subsequent requests to store data in the flash memory. Freeing space entails erasing data from the flash memory device, thus data in virtual flash memory may only be stored temporarily. Applications that use virtual flash memory as described herein are preferably applications that use flash memory for temporary storage, such as a cache.

Exemplary Flash Memory Device

Figure 1:
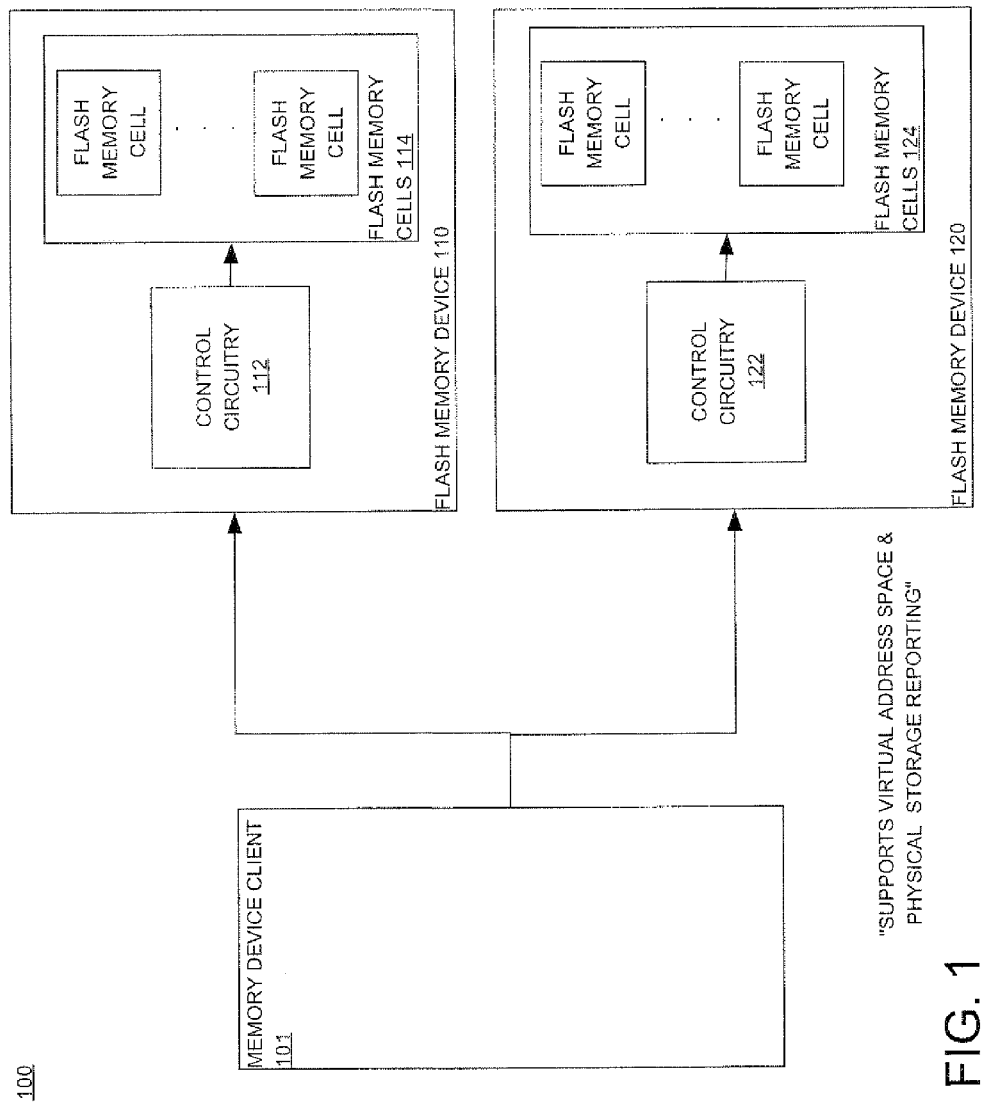
FIG. 1 is a diagram depicting a flash memory device according to an embodiment of the present invention.

Referring to FIG. 1, it depicts a flash memory system 100. A flash memory system comprises one or more flash memory clients that may issue I/O requests to one or more flash memory devices to access a unit of memory at one or more logical addresses specified in the requests. Flash memory system 100 comprises Memory Device Client 101 and Flash Memory Device 110 and Flash Memory Device 120.

A Memory Device Client 101 is a computing device comprising one or more processors and a memory. Computing devices include, without limitation, computer systems, such as a personal computer, server, server blade, mobile smart phone, game device, or a television system.

Flash Memory Device 110 and Flash Memory Device 120 are each flash memory devices comprising flash memory cells and control circuitry for accessing and managing data stored in flash memory cells. Flash Memory Device 110 comprises Control Circuitry 112 and Flash Memory Cells 114 and Flash Memory Device 120 comprise control circuitry 122 and Flash Memory Cells 124.

In an embodiment, a flash memory cell is a NAND memory cell, although other flash memory technologies can be used. A flash memory cell can be a single memory die or multiple memory dies. In an embodiment, a flash memory device may comprise only one memory cell that is a single memory die.

Control circuitry is circuitry for accessing and storing data on flash memory cells of a flash memory device. Control circuitry performs various functions, which include, without limitation, processing I/O requests from memory device clients to read and erase data from flash memory cells, writing data to flash memory cells, error detection, encryption, write wear balancing, addressing mapping (mapping logical addresses to physical addresses), and compression. Control circuitry may comprise one or more processors, one or more controllers, and memory and registers. The various functions are performed by hard-wire circuitry, by processor execution of software instructions, or a combination thereof.

A memory device client accesses data in a flash memory device by issuing I/O requests to the flash memory device that specify a logical address for a unit of memory to access. A unit of memory accessed and referenced by the logical address is referred to herein as a memory block or simply block. Control circuitry of the flash memory device handles and responds to the I/O request. To access the memory block, control circuitry determines the physical address corresponding to a logical address specified in the I/O request. Control circuitry maintains a mapping of logical addresses to physical addresses, referred to herein as a logical-physical address mapping.

A logical-physical address mapping enables a memory device client to treat a block identified by the same logical address as the same block, while the flash memory device may store that block at any physical address. A block identified by a logical address may be stored at different physical locations at different times. A logical-physical address mapping is useful for a variety of purposes.

For example, due to the write or erase characteristics of flash memory, as the number of write/erase cycles increases, write and erase efficiency may degrade. Such degradation is referred to herein as write wear. Write wear may be ameliorated by an approach referred to herein as write wear balancing. Under write wear balancing, writes are balanced among the physical blocks in flash memory.

A logical-physical address mapping makes write wear balancing feasible. A memory device client may issue multiple I/O requests to write the same block as identified by the same block address, while the flash memory device may vary the physical address and thus physical location as needed for write wear balancing.

Compression

Native compression is another technique used to ameliorate write wear. Under native compression, blocks requested to be written to a flash memory device by a memory device client are compressed and written by the flash memory device into a smaller number of physical blocks. Thus, a number of logical blocks may be stored in a smaller number of physical blocks. Control circuitry in a flash memory device compresses data in logical blocks requested by a memory device client to be written to the flash memory device and stores the logical blocks in a lesser number of physical blocks. As a result, writing a number of logical blocks is accomplished by performing a lesser number of writes to physical blocks, thereby reducing write wear.

As control circuitry compresses and writes the logical blocks to flash memory, it maintains a logical-physical address mapping to map logical addresses to physical addresses. However, under compression, multiple logical addresses may be mapped to a physical address A flash memory device has a physical storage capacity which may be measured in terms of a unit of bytes, such as gigabytes, or in terms of a number of physical blocks. Storage capacity as measured in terms of physical blocks is referred to herein as physical block capacity. Storage capacity as measured in logical blocks is referred to herein as logical block capacity. The number of physical addresses in the physical address space may equal the physical block capacity. The number of logical addresses in the logical address space may equal the logical addresses in the logical address space.

With compression, it is possible that when the quantity of logical blocks stored equals the physical block capacity, a lesser number of physical blocks are actually used to store the logical blocks, the lesser number being less than the physical block capacity. The difference between this quantity and the lesser number is referred to herein as the compression surplus. Thus, compression surplus reflects a number of logical blocks that can be stored beyond the physical block capacity.

Compression surplus is not fixed because compressibility is not fixed. Compression surplus can in fact vary widely for a particular flash memory device. Furthermore, compression surplus may not exist in some applications. For example, a flash memory device may store data that has already been compressed by a memory device client.

Vendors of flash memory devices may guarantee a minimum storage capacity of their flash memory devices. Because of the variable unfixable nature of compression surplus, flash memory devices may not be configured to use compression surplus to store logical blocks. The number of logical blocks that can be stored on flash memory devices is limited to storage capacity of the flash memory devices, that is, the logical block capacity is limited to the physical block capacity.

Virtual Flash Memory

In an embodiment, compression surplus is used to store a number of logical blocks beyond the physical block capacity of a memory device. Because this number exceeds the physical block capacity, techniques that use a flash memory device to store a number of logical blocks that exceed physical block capacity are referred to herein as virtual flash memory. The logical address space of the virtual flash memory is referred to herein as a virtual address space. A virtual address space exceeds the physical address space.

It should be noted in various applications that employ virtual memory, the virtualized memory is implemented using another form of memory. According to approaches for virtual flash memory described herein, the same memory is used to expand the virtualized memory beyond its physical block capacity through the use of compression.

With virtual flash memory, a number of physical blocks is used to store a number of logical blocks, which is expected in many cases to exceed the physical block capacity. The number of physical blocks used to store the logical blocks is referred to herein as the realized physical usage.

As with physical addresses or logical addresses, when a logical block is written to a logical address of a logical address space, the logical address is referred to as being populated, until the logical block is erased. A memory device client may issue an I/O request to request to erase a logical block at a logical address. Such a request is referred to herein as a trim request. A logical address that according to the flash memory device is not populated, i.e. does not store a logical block, is referred to herein as a free logical address. Control circuitry in a flash memory device tracks the logical addresses that are free or that are populated. The number of logical blocks that a flash memory records as being populated is referred to herein as realized logical block usage.

Under virtual flash memory, a flash memory device exposes a virtual address space that is larger than the physical address space. As the virtual address space is populated, it is possible to completely populate the physical block capacity before completely populating the virtual address space. Once this point is reached, the flash memory device will be unable to honor a I/O request to write a logical block to a free virtual address. The realized logical block usage at the point where physical block capacity is fully populated is referred to as the virtual block capacity.

Virtual flash memory presents several unique characteristics that are unique with respect to non-virtualized flash memory implementations. For non-virtualized flash memory, the logical address may be fully populated and the logical block capacity is fixed to the physical block capacity. Many applications using flash memory devices rely on the ability to completely populate the logical address space.

For virtual flash memory, the logical address space may or may not be completely populated before reaching the physical block capacity of a flash memory device.

Another unique characteristic of virtual flash memory is that the virtual block capacity is variable. As compressibility varies, the virtual block capacity varies.

The variable nature of virtual block capacity presents challenges to managing a virtual flash memory device, including management of free space on the flash memory device. Thus, applications of virtual memory flash memory are preferably implemented in applications that either tolerate the variable nature of virtual block capacity and/or that can exploit the variable nature. An example of such an application is a flash cache in a storage device, such as further described below.

Dynamic Flash Cache

An important ability to managing variability of virtual flash memory is the ability to ensure that a memory device client can honor requests to write a logical block to any free virtual address within a virtual address space. The ability to write to a free logical address is referred to herein as free address fidelity. Preserving free address fidelity can be achieved, at least in part, by erasing logical blocks to free up space with which to honor subsequent logical block write requests. Thus, an important characteristic of applications in which virtual memory is preferably implemented is the ability to tolerate erasure of logical blocks ad hoc as needed to free up space to maintain free address fidelity.

A cache is an example of such an application. Examples of caches that can use virtual flash memory are described in U.S. patent application Ser. No. 13/288,785, U.S. patent application Ser. No. 12/631,985, and U.S. patent application Ser. No. 12/691,146. As with caches in general, the storage of data in a cache is temporary; applications that use caches are designed with this characteristic in mind. A cache stores copies of data stored in a backing store. As part of a cache management policy, in a steady state data is removed from a cache to free space for data to be subsequently cached in the cache.

According to approaches for virtual flash memory described herein, responsibility for managing free space rests in large part with the memory device client. To support this responsibility, a virtual flash memory device provides the following features.

Expose Virtual Address Space:

As described before, a virtual flash memory device must be configured to expose a logical address space that is larger than the physical block address space or physical block capacity. According to an embodiment, a flash memory device may provide an interface through which the flash memory device reports the virtual address space the flash memory device makes available.

Physical Storage Reporting:

A flash memory device may provide an interface through which the flash memory device reports realized physical usage. The interface enables a memory device client to determine how much free physical space is left in a flash memory device and when to "flush" logical blocks, that is, erase logical blocks to maintain free space fidelity.

Figure 2:
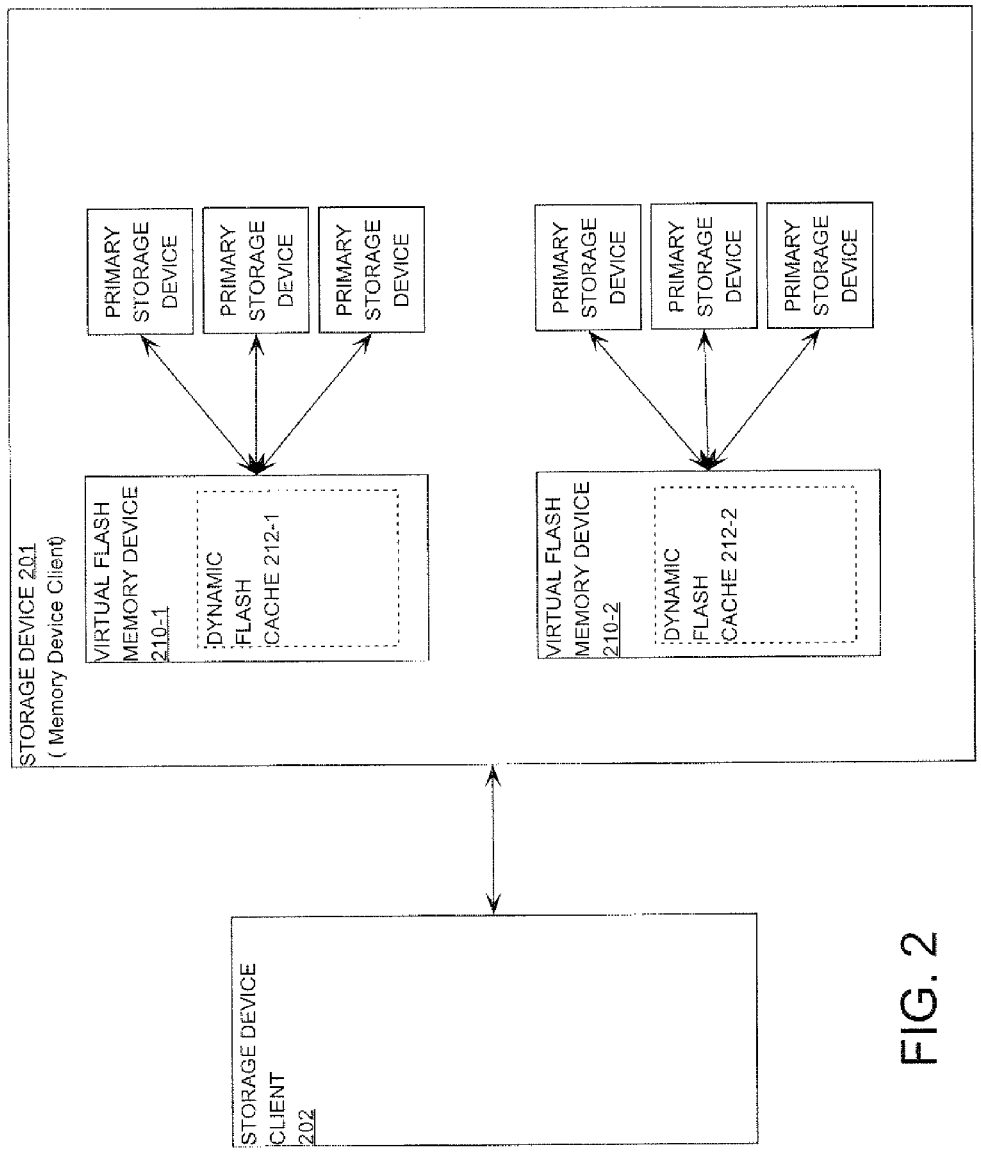
FIG. 2 is a diagram depicting a storage device according to an embodiment of the present invention.

FIG. 2 illustrates an embodiment of a "dynamic flash cache" that uses virtual flash memory. The flash cache is referred to as dynamic at least in part because the maximum amount of data that may be stored in the cache varies.

Referring to FIG. 2, it depicts storage device 201 comprising Virtual Flash Memory Device 210-1 and Virtual Flash Memory Device 210-2. Flash memory of Virtual Flash Memory Device 210-1 and Virtual Flash Memory Device 210-1 is used for Dynamic Flash Cache 212-1 and Dynamic Flash Cache 212-2, respectively. Each of Dynamic Flash Cache 212-1 and Dynamic Flash Cache 212-2 serves as a cache for a particular set of primary storage devices (not labeled).

Storage device 201 is a memory device client of Virtual Flash Memory Device 210-1 and Virtual Flash Memory Device 210. Virtual Flash Memory Device 210-1 and Virtual Flash Memory Device 210-2 are configured to expose a virtual address space and support physical storage reporting.

According to an embodiment, a primary storage device is a disk drive device. However, this is merely one example of the types of memory devices that may be used to implement a primary storage device in an embodiment.

Storage device client 202 is a client of storage device 201. An example of a storage device client is a database server, including a multi-node database server with each node running an instance of a database server and having shared access to storage device 201. It should be noted that the present invention is not limited to database servers as storage device clients, or to any number storage device clients.

According to an embodiment, storage device 201 is a computer system complete with one or more CPUs and volatile memory. The CPU, pursuant to execution of software, manages operation of storage device 201.

Storage device 201 is a block mode device. A block mode device provides a client access to data in units referred to as a data block. A data block is the atomic unit of data that a storage device client may request to read from and write to a storage device.

Data in a primary storage device in storage device 201 is also organized by data blocks. A data block is associated with a data block address which uniquely identifies the data block and the data block's storage location within a storage device. A data block's "primary block address" is an address that identifies a storage location of the data block within a primary storage device in storage device 201. A storage device client may request a data block by primary block address, or even by primary block address ranges of data blocks.

Storage in Dynamic Flash Cache 212-1 and Dynamic Flash Cache 212-2 is also organized by data block. Copies of data blocks from a primary storage device are stored in a Dynamic Flash Cache 212-1 and Dynamic Flash Cache 212-2. A copy of a data block in a primary storage device that is stored in Dynamic Flash Cache 212-1 or Dynamic Flash Cache 212-2 is referred to herein as a cache copy or a cached data block.

Flushing to Maintain Free Space Fidelity

Figure 3:
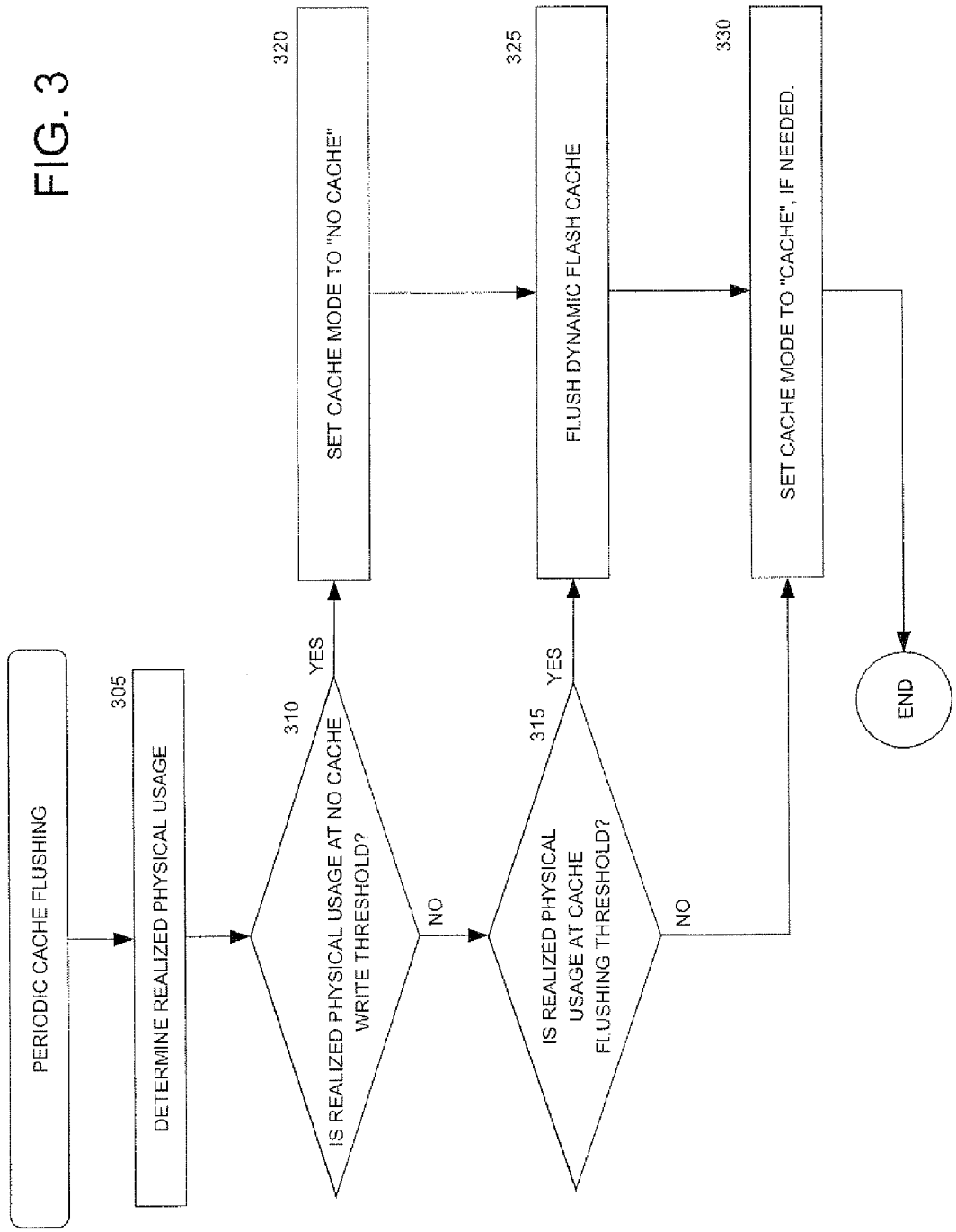
FIG. 3 is a flowchart showing operations performed for periodic cache flushing for a dynamic flash cache according to an embodiment of the present invention.

FIG. 3 depicts a procedure used to maintain free space fidelity; the procedure is referred to herein as periodic cache flushing. The procedure is illustrated using storage device 201, however the procedure may be implemented on any computing device using virtual flash memory. The procedure is performed periodically by, for example, a daemon process on storage device 201. The procedure is run periodically for each dynamic flash cache on a virtual memory device of storage device 201. For purposes of exposition, the procedure is illustrated using Dynamic Flash Cache 212-1 on Virtual Flash Memory Device 210-1.

Referring to FIG. 3, at 305, storage device 201 determines the physical block capacity of Virtual Flash Memory Device 210-1. Storage device 201 makes this determination by invoking physical storage reporting interface of Virtual Flash Memory Device 210-1 to request the realized physical usage from Virtual Flash Memory Device 210-1.

Next, the procedure may determine whether realized physical usage has reached one of several thresholds. The highest threshold is the "No Cache Write" threshold. If this threshold is reached, cache writes to Dynamic Flash Cache 212-1 are prevented and cache flushing is initiated. The next highest threshold is the "Caching Flushing" threshold. At this threshold, cache flushing is initiated to free space in Dynamic Flash Cache 212-1, but cache writes are not prevented.

At 310, storage device 201 determines whether the realized physical usage has reached the No Cache Write threshold. If so, then at 320, a "cache mode" for Dynamic Flash Cache 212-1 is set to No Cache Write, thereby preventing cache writes to Dynamic Flash Cache 212-1 until the cache mode is changed.

The No Cache Write threshold and frequency of periodic cache flushing is preferably established to prevent exhausting the physical storage capacity of Dynamic Flash Cache 212-1 between executions of periodic cache flushing. The threshold and frequency may be based on the frequency of cache writes to Dynamic Flash Cache 212-1. Preferably, the threshold is set such that it is very unlikely that storage device client 202 will issue I/O requests sufficient between executions of the periodic cache flushing to completely fill the free space on Virtual Flash Memory Device 210-1. According to an embodiment, the No Cache Write threshold is set to 97% of the physical storage capacity while the Caching Flushing threshold is set to 94%. These thresholds are illustrative and not limiting.

At 315, storage device 201 determines whether realized physical usage has reached the Cache Flushing threshold. If so, then at 325, Dynamic Flash Cache 212-1 is flushed to free space in Virtual Flash Memory Device 210-2.

Flushing Dynamic Flash Cache 212-1 entails storage device client issuing I/O requests to trim blocks within Virtual Flash Memory Device 210-1. Because storage device 201 stores data blocks in Dynamic Flash Cache 212-1, storage device 201 determines which data blocks to remove from Dynamic Flash Cache 212-1, and then which memory blocks for which to issue trim requests to Virtual Flash Memory Device 210-1 to free the selected data blocks. There may not be a one-to-one correspondence between a data block and a memory block in Virtual Flash Memory Device 210-1.

It is preferable to trim only a threshold portion of the data blocks stored in Virtual Flash Memory Device 210-1. The data blocks selected for removal may be selected based on various cache policies, such as least recent use and frequency of use.

At 330, the cache mode is set to "Cache", if needed, thereby causing storage device 201 to use Virtual Flash Memory Device 210-1 to cache data blocks.

During various executions of periodic cache flushing, the Cache Flushing threshold and the No Cache Write threshold will correspond to a fixed realized physical usage but to a different realized logical block usage. Thus, in executions of periodic cache flushing, flushing of the cache may be initiated or the cache mode may be set to No Cache Write at different realized logical block usages; in one such the execution realized logical block usage may be higher or lower than in previous or subsequent such execution.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
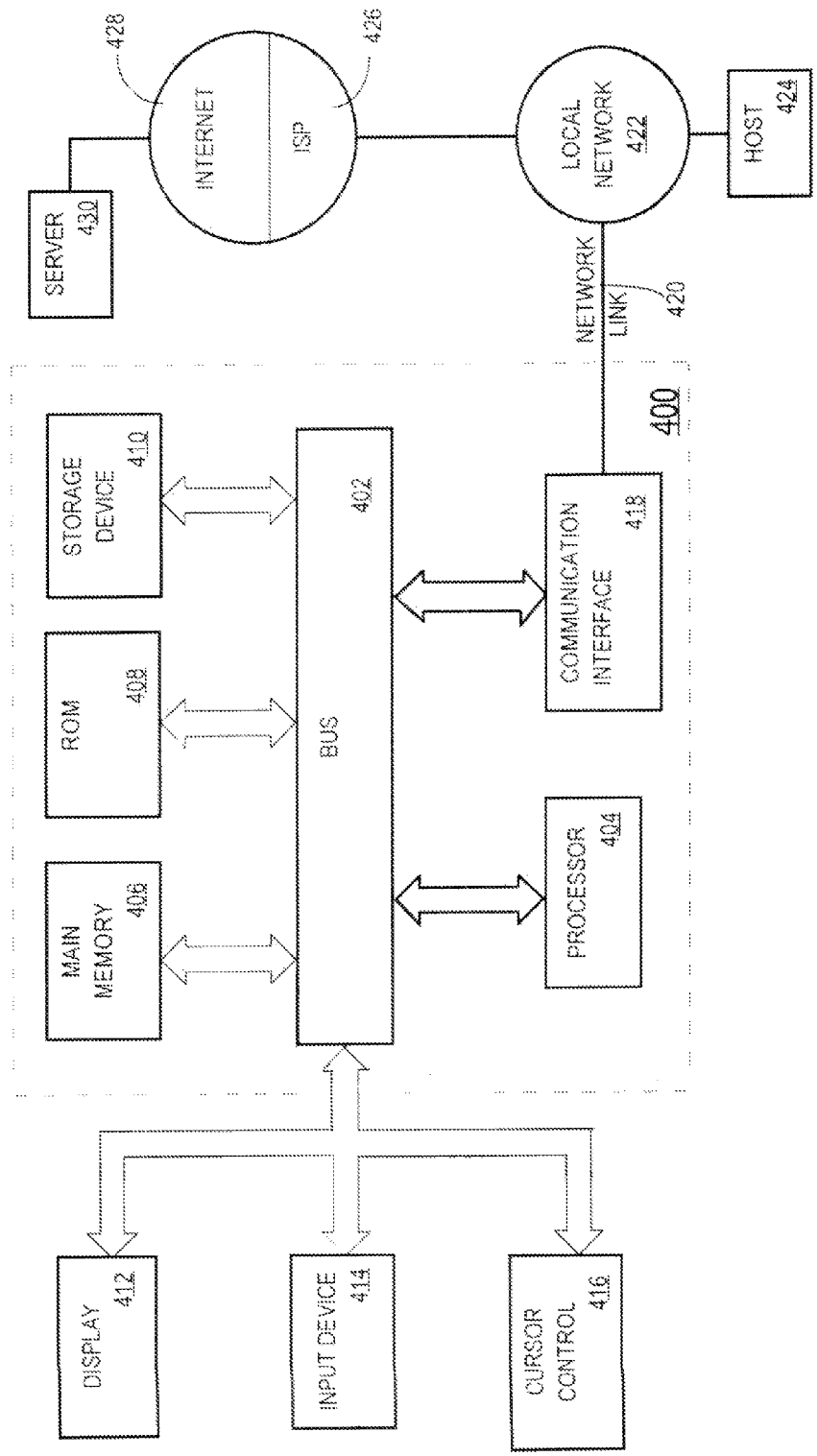
FIG. 4 is a diagram depicting a computer system that may be used in an embodiment of the present invention.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method, comprising steps of:
   writing data in memory blocks of a flash memory device that exposes a logical address space that is larger than a physical address space of the flash memory device, wherein writing data comprises issuing I/O requests to write data, each I/O request specifying a respective logical address space in said logical address space to which to write data; and
   periodically performing:
      making a determination that a particular realized physical usage of said flash memory device has reached a threshold, and
      in response to making said determination, issuing I/O requests to trim data at logical addresses within the logical address space;
   wherein periodically performing includes:
      making a first determination that a first realized physical usage of said flash memory device has reached said threshold, and
      in response to making said first determination, issuing I/O requests to trim data at logical addresses within the logical address space;
      making a second determination that a second realized physical usage of said flash memory device has reached said threshold, and in response to making said second determination, issuing I/O requests to trim data at logical addresses within the logical address space;
wherein a first realized logical usage corresponds to the first realized physical usage of the first determination;
wherein a second realized logical usage corresponds to the second realized physical usage of the second determination;
wherein the first realized physical usage is equal to the second realized physical usage; and
wherein the second realized logical usage is greater than the first realized logical usage.

2. The method of claim 1, wherein said physical address space comprises a first number of physical addresses, wherein writing data comprises writing to a greater number of logical addresses than said first number.

3. The method of claim 1, wherein said flash memory device compresses a number of logical blocks to store in a lesser number of physical blocks.

4. The method of claim 1, wherein determining whether the particular realized physical usage of said flash memory device has reached a threshold includes issuing a request to said flash memory device to report a realized physical usage.

5. A method, comprising steps of:
writing data blocks to a cache in a flash memory device that exposes a logical address space that is larger than a physical address space of the flash memory device, wherein writing data blocks comprises issuing I/O requests to said flash memory device to write data, each I/O request specifying a respective logical address within said logical address space to which to write data; and
periodically performing:
making a determination that a particular realized physical usage of said flash memory device has reached a first threshold, and
in response to making said determination, removing a set of data blocks from said cache, wherein removing a set of data blocks from said cache comprises issuing I/O requests to trim data at logical addresses within the logical address space,
wherein periodically performing includes:
making a first determination that a first realized physical usage of said flash memory device has reached said first threshold, and
in response to making said first determination, removing a set of data blocks from said cache, wherein removing a set of data blocks from said cache comprises issuing I/O requests to trim data at logical addresses within the logical address space;
making a second determination that a second realized physical usage of said flash memory device has reached said first threshold, and
in response to making said second determination, removing a set of data blocks from said cache, wherein removing a set of data blocks from said cache comprises issuing I/O requests to trim data at logical addresses within the logical address space;
wherein a first realized logical usage corresponds to the first realized physical usage of the first determination;
wherein a second realized logical usage corresponds to the second realized physical usage of the second determination;
wherein the first realized physical usage is equal to the second realized physical usage; and
wherein the second realized logical usage is greater than the first realized logical usage.

6. The method of claim 5, wherein periodically performing further includes:
determining whether another realized physical usage has reached a second first threshold, said second threshold being greater than said first threshold; and
if said another realized physical usage has reached a second threshold, preventing storing data blocks in said cache.

7. The method of claim 5, wherein said physical address space comprises a first number of physical addresses, wherein writing data comprises writing to a greater number of logical addresses than said first number.

8. The method of claim 5, wherein said flash memory device compresses a number logical blocks, thereby storing a greater number of logical blocks in a lesser number of physical blocks.

9. The method of claim 5, wherein determining whether the particular realized physical usage of said flash memory device has reached a first threshold includes issuing a request to said flash memory device to report a realized physical usage.

10. One or more non-transitory storage media storing instructions which, when executed by one or more computing devices, cause:
writing data in memory blocks of a flash memory device that exposes a logical address space that is larger than a physical address space of the flash memory device, wherein writing data comprises issuing I/O requests to write data, each I/O request specifying a respective logical address space in said logical address space to which to write data; and
periodically performing:
making a determination that a particular realized physical usage of said flash memory device has reached a threshold, and
in response to making said determination, issuing I/O requests to trim data at logical addresses within the logical address space;
wherein periodically performing includes:
making a first determination that a first realized physical usage of said flash memory device has reached said threshold, and
in response to making said first determination, issuing I/O requests to trim data at logical addresses within the logical address space;
making a second determination that a second realized physical usage of said flash memory device has reached said threshold, and
in response to making said second determination, issuing I/O requests to trim data at logical addresses within the logical address space;
wherein a first realized logical usage corresponds to the first realized physical usage of the first determination;
wherein a second realized logical usage corresponds to the second realized physical usage of the second determination;
wherein the first realized physical usage is equal to the second realized physical usage; and
wherein the second realized logical usage is greater than the first realized logical usage.

11. The one or more non-transitory storage media of claim 10, wherein said physical address space comprises a first number of physical addresses, wherein writing data comprises writing to a greater number of logical addresses than said first number.

12. The one or more non-transitory storage media of claim 10, wherein said flash memory device compresses a number of logical blocks to store in a lesser number of physical blocks.

13. The one or more non-transitory storage media of claim 10, wherein determining whether the particular realized physical usage of said flash memory device has reached a threshold includes issuing a request to said flash memory device to report a realized physical usage.

14. One or more non-transitory storage media storing instructions which, when executed by one or more computing devices, cause:
   writing data blocks to a cache in a flash memory device that exposes a logical address space that is larger than a physical address space of the flash memory device, wherein writing data blocks comprises issuing I/O requests to said flash memory device to write data, each I/O request specifying a respective logical address within said logical address space to which to write data; and
   periodically performing:
      making a determination that a particular realized physical usage of said flash memory device has reached a first threshold, and
      in response to making said determination, removing a set of data blocks from said cache, wherein removing a set of data blocks from said cache comprises issuing I/O requests to trim data at logical addresses within the logical address space,
   wherein periodically performing includes:
      making a first determination that a first realized physical usage of said flash memory device has reached said first threshold, and
      in response to making said first determination, removing a set of data blocks from said cache, wherein removing a set of data blocks from said cache comprises issuing I/O requests to trim data at logical addresses within the logical address space;
      making a second determination that a second realized physical usage of said flash memory device has reached said first threshold, and
      in response to making said second determination, removing a set of data blocks from said cache, wherein removing a set of data blocks from said cache comprises issuing I/O requests to trim data at logical addresses within the logical address space;
      wherein a first realized logical usage corresponds to the first realized physical usage of the first determination;
      wherein a second realized logical usage corresponds to the second realized physical usage of the second determination;
      wherein the first realized physical usage is equal to the second realized physical usage; and
      wherein the second realized logical usage is greater than the first realized logical usage.

15. The one or more non-transitory storage media of claim 14, wherein the instructions include instructions, that when executed by one or more processors, cause periodically performing to include:
   determining whether another realized physical usage has reached a second first threshold, said second threshold being greater than said first threshold; and
   if said another realized physical usage has reached a second threshold, preventing storing data blocks in said cache.

16. The one or more non-transitory storage media of claim 14, wherein said physical address space comprises a first number of physical addresses, wherein writing data comprises writing to a greater number of logical addresses than said first number.

17. The one or more non-transitory storage media of claim 14, wherein said flash memory device compresses a number logical blocks, thereby storing a greater number of logical blocks in a lesser number of physical blocks.

18. The one or more non-transitory storage media of claim 14, wherein determining whether the particular realized physical usage of said flash memory device has reached a first threshold includes issuing a request to said flash memory device to report a realized physical usage
   writing data in memory blocks of a flash memory device that exposes a logical address space that is larger than a physical address space of the flash memory device, wherein writing data comprises issuing I/O requests to write data, each I/O request specifying a respective logical address space in said logical address space to which to write data; and
   periodically performing:
      making a first determination that a realized physical usage of said flash memory device has reached a first threshold, and
      in response to making said first determination, issuing I/O requests to trim data at logical addresses within the logical address space.

* * * * *